(12) United States Patent
Keidar et al.

(10) Patent No.: US 11,228,498 B2
(45) Date of Patent: *Jan. 18, 2022

(54) DATA AGGREGATION BASED ON A HEIRARCHICAL TREE

(71) Applicant: SAP Portals Israel Ltd., Ra'anana (IL)

(72) Inventors: Michal Keidar, Herzeliya (IL); Eyal Barlev, Hod Hasharon (IL); Ido Goren, Tel Aviv (IL)

(73) Assignee: SAP Portals Israel Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,901

(22) Filed: Jun. 2, 2020

(65) Prior Publication Data
US 2020/0296003 A1    Sep. 17, 2020

Related U.S. Application Data

(63) Continuation of application No. 16/173,736, filed on Oct. 29, 2018, now Pat. No. 10,715,394.

(51) Int. Cl.
| | |
|---|---|
| *H04L 12/24* | (2006.01) |
| *G06F 16/22* | (2019.01) |
| *G06F 21/62* | (2013.01) |
| *H04L 12/44* | (2006.01) |
| *H04L 29/08* | (2006.01) |

(52) U.S. Cl.
CPC .......... *H04L 41/12* (2013.01); *G06F 16/2246* (2019.01); *G06F 21/6254* (2013.01); *G06F 21/6263* (2013.01); *H04L 12/44* (2013.01); *H04L 41/0816* (2013.01); *H04L 41/0853* (2013.01); *H04L 67/125* (2013.01)

(58) Field of Classification Search
CPC ..... H04L 41/0853; H04L 41/12; H04L 12/44; H04L 41/0816; H04L 67/125; H04L 67/22; G06F 16/2246; G06F 21/6254; G06F 21/6263; H04W 4/70
See application file for complete search history.

(56) References Cited

U.S. PATENT DOCUMENTS

| | | |
|---|---|---|
| 8,429,203 B2 | 4/2013 | Perez et al. |
| 8,972,900 B2 | 3/2015 | Rotshtein et al. |
| 9,876,823 B2 | 1/2018 | Smith et al. |

(Continued)

OTHER PUBLICATIONS

Extended European Search Report issued in European Application No. 19195382.7 dated Jan. 7, 2020, 7 pages.

*Primary Examiner* — Mohamed A. Wasel
(74) *Attorney, Agent, or Firm* — Fish & Richardson P.C.

(57) ABSTRACT

At each delegate device and each non-delegate device of a logical device hierarchy, a data cube is generated. The logical device hierarchy includes more than one level, and each level includes one or more groups, and each group includes one delegate device and one or more non-delegate devices. At each delegate device, data cubes are received from the one or more non-delegate devices associated with the same group. At each delegate device, data cubes are received from delegate devices of a different group, and that delegate device is the parent of the delegate devices associated with a different group. At each delegate device, the received data cubes are aggregated into a weighted data cube. From each delegate device, the weighted data cube are outputted to the parent of the delegate device.

20 Claims, 5 Drawing Sheets

(56) References Cited

U.S. PATENT DOCUMENTS

| | | |
|---|---|---|
| 10,296,551 B2 * | 5/2019 | Minwalla .............. H04L 43/062 |
| 2002/0035573 A1 | 3/2002 | Black et al. |
| 2013/0138698 A1 | 5/2013 | Harada et al. |
| 2013/0246334 A1 | 9/2013 | Ahuja et al. |
| 2013/0275569 A1 | 10/2013 | Calo et al. |
| 2016/0050126 A1 | 2/2016 | Rubio |
| 2017/0191849 A1 | 7/2017 | Agam et al. |
| 2017/0255373 A1 | 9/2017 | Bruno et al. |
| 2019/0392328 A1 | 12/2019 | Bulacio et al. |
| 2020/0004868 A1 | 1/2020 | Rao et al. |
| 2020/0084153 A1 * | 3/2020 | Ma ...................... H04L 12/4641 |
| 2020/0136915 A1 | 4/2020 | Keider et al. |

* cited by examiner

DATA AGGREGATION BASED ON A HEIRARCHICAL TREE

CLAIM OF PRIORITY

This application claims priority under 35 USC § 120 to U.S. patent application Ser. No. 16/173,736, filed on Oct. 29, 2018, the entire contents of which are hereby incorporated by reference.

BACKGROUND

The Internet of Things (IoT) refers to a distributed network of uniquely identifiable devices (such as, networked sensors and equipment) and their representations. In some implementations, the devices can possess degrees of autonomous intelligence and can provide information through data capture and communication capabilities, which can be used to perform actions based on the received information. The devices can be remotely controlled over the network, if permitted to do so, by security/privacy settings and functionality. IoT infrastructure can be considered to include existing and evolving Internet and network developments and can offer specific device-identification, sensor, and connection capability as a basis for development of independent cooperative services and applications, including mash-ups. IoT can be characterized by a high-degree of autonomous data capture, event transfer, network connectivity, and interoperability. Current IoT functionality is limited due to, among other things, costs of IoT infrastructure maintenance and data privacy concerns.

SUMMARY

The present disclosure describes collecting data associated with various devices within a logical hierarchy of data sources.

In an implementation, at each delegate device and each non-delegate device of a logical device hierarchy, a data cube is generated. The logical device hierarchy includes more than one level, and each level includes one or more groups, and each group includes one delegate device and one or more non-delegate devices. At each delegate device, data cubes are received from the one or more non-delegate devices associated with the same group. At each delegate device, data cubes are received from delegate devices of a different group, and that delegate device is the parent of the delegate devices associated with a different group. At each delegate device, the received data cubes are aggregated into a weighted data cube. From each delegate device, the weighted data cube are outputted to the parent of the delegate device.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, the disclosed solution describes a logical device hierarchy (for example, in an Internet of Things (IoT) environment) that preserves data privacy by anonymously collecting data associated with devices within the hierarchy. Second, unlike centralized solutions used in existing technology, the disclosed decentralized solution does not require a central cloud service or an on-premise service to be used, reducing costs for maintenance of the service. In addition, software and hardware within the hierarchy can be updated in a safe manner, and the first level of the hierarchy confirms update validity before populating the update downwards into the hierarchy.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes a logical hierarchy of data sources presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Data is a valuable asset (for example, for scientific or educational research; computer system monitoring, maintenance, and operation; and for entities (such as, universities, or companies). In some cases, business owners have started adopting IoT technologies and can gather data associated with provided products for analytical purposes (for example, to improve products, delivery, and marketing). For example, a business owner with many trucks that deliver goods may wish to track a real-time location of the goods when the trucks are in transit.

An IoT approach can provide many benefits, especially in access to increasing amounts of useful data and to gain better insights from the data (for example, performance, operation, maintenance, security, and efficiency of associated devices). On the other hand, the IoT approach also has technical challenges. For example, size of data and data collection speed associated with each device can be a resource drain on an IoT network infrastructure. In addition, accessing private user data has legal, business, and moral implications. Gathering important analytics on usage and other parameters can possibly compromise a user's privacy. This makes collecting data from consumer devices more difficult.

Home IoT device manufacturers would like to gather data on devices that they no longer own, but the IoT devices may not be always connected to a network (such as, the Internet). For example, manufacturers of smart locks or smart light bulbs are usually not able to obtain analytics associated with consumer goods they have sold, since consumers are less willing to report their data due to privacy concerns. However, such data is seen as critical to the IoT manufacturers in order to gather insights about device usage and to permit improvement to the device and overall business success. Therefore, a solution that can reduce service costs while preserving data privacy is desired.

Solutions provided by various analytics platforms gather data from an individual IoT device and performs analytics on the partially analyzed data or raw data in a centralized manner, for example, on an analytics platform server or a cloud service, which can expose potential private data (for example, to employees of a service provider). Moreover, using the described service is also typically expensive. Some manufacturers retain a so-called "edge analytics" solution, meaning a system where analytics are performed at a point where (or very close to where) data is collected. Rather than designing centralized systems where all collected data is sent back to a data warehouse in a raw state, an edge analytics solution is configured to perform analysis on the "edge" (that is, on a device) of the system. However, just like the centralized solution, edge analytics can also result in compromise of private data associated with each device, since the data is not transmitted anonymously in the network.

In this disclosure, a decentralized network approach is described, in which much of the analysis is performed at the edge (for example, at home/consumer IoT devices) while analysis results are transmitted anonymously back to an entity (such as, a manufacturer). A logical hierarchy of data sources is dynamically constructed for the purpose of gathering analytics. For example, after a consumer purchases a device and connects the device to the Internet, the device can be paired with other devices to construct a hierarchical tree. In some cases, the top of the tree can be considered the manufacturer of the device. In this type of hierarchy, devices can be grouped into logical relationships.

In some implementations, the hierarchical structure can be maintained using several mechanisms. First, devices in each group can collect data and send it together with data received from direct hierarchical descendants (that is, children). Second, the data received from each direct child can be anonymously aggregated as a weighted data cube. Finally, the anonymized data can be propagated up the hierarchy until it is received at the manufacturer. The manufacturer can also distribute updates to the devices down the hierarchy in a phased manner.

In some implementations, security aspects of the described approach can rely on known technologies in the domains of encryption, certificates, and trust (for example, TLS or OpenID Connect). Specifically, data sources can establish trust among each other by establishing communications using TLS (for example, TLS certificates can ensure that all data sources have an identical origin and connections between data sources are self-created, and a handshaking process creates trust). In some cases proprietary technologies can be leveraged in order to enhance or to provide all or some security aspects to the described approach. Malicious patterns can also be detected (using known or proprietary techniques), and trust afforded to malicious data sources can be revoked on detection of the malicious patterns.

In one example, a manufacturer sold a fleet of smart home coffee machines to different consumers, and the manufacturer wants to collect reports based on information associated with the coffee machines. The first report is with respect to a temperature of the coffee machine according to location. The second report is with respect to a percentage of people drinking espresso compared to a percentage of people drinking cappuccino, and grouped by location. The third report is with respect to a time between failures based on a type of coffee (for example, espresso vs. cappuccino) and location. In this example, device connections are constructed based on a location (for example, by longitude and latitude). Each set of connected devices are by definition considered to be in the same location. Devices report temperature to a delegate (explained in more detail below). The delegate calculates an average temperature of the reported temperature measurements (anonymized), and sends the average temperature up the hierarchy until it reaches the manufacturer. For the second and the third report, a single constructed hierarchy can be used, as both reports consist of the same dimensions. Device connections are constructed based on location (for example, by longitude and latitude) and a type of coffee (espresso/cappuccino). Each set of connected devices are, by definition, considered to be in the same location and to share the same coffee type. Devices report to a delegate a time between failures and a percentage of people. The delegate calculates an average of these measures (anonymized) and sends the average values up the hierarchy until it reaches the manufacturer.

This decentralized solution maintains data privacy through various mechanisms. First, participants (for example, devices) are grouped by dimensions, and the dimensions are further grouped by ranges (for example, by age or by location) to further anonymize the data. In a data warehouse analysis, dimensions provide structured labeling information to otherwise unordered numeric measures. For example, to gather examination results from a group of people (that is, to know what an age range is and what an average test result per each age group), first the participants are divided into various age categories, for example, divided by every 10 years. Then, examination results within each group can be gathered and used to calculate an average score for each group. In this way, privacy for each individual participant can be preserved and each particular score cannot be traced back to a particular participant. Second, the decentralized solution maintains data privacy by imposing limitations on connections between participants. The number of connections in the hierarchy is kept to a minimum. In this way, if a certain participant is compromised, only data associated with that participant is exposed, and data received from other participants, by definition, is kept anonymized. Third, the decentralized solution maintains data privacy by eliminating outliers. Aggregating data provides a good measure or privacy by definition. However, if there is a very small amount of data for a particular dimension (for example, location), the source of data can be traced. For example, in the last example, if there is only one participant in a particular age group (that is, an outlier), the score of this participant can be traced back to that particular participant. The decentralized solution tackles such problems by eliminating the outliers. Detecting outliers is simple in a centralized solution, where before, in generating a data analysis final report, the outlier can be eliminated from the result (since the identity of the outlier is exposed from the beginning). In the decentralized solution, however, this can be a challenge because every edge only holds part of the big picture. The decentralized solution has no knowledge of whether there are similar dimensions in existence in the hierarchy. Therefore, the disclosed solution only groups participants if they are homogeneous with at least one other participant (that is, they have identical dimensions). As such, this solution can prevent outliers from joining the hierarchy in the first place since a single participant will not be homogenous with at least one other participant.

Figure 1:
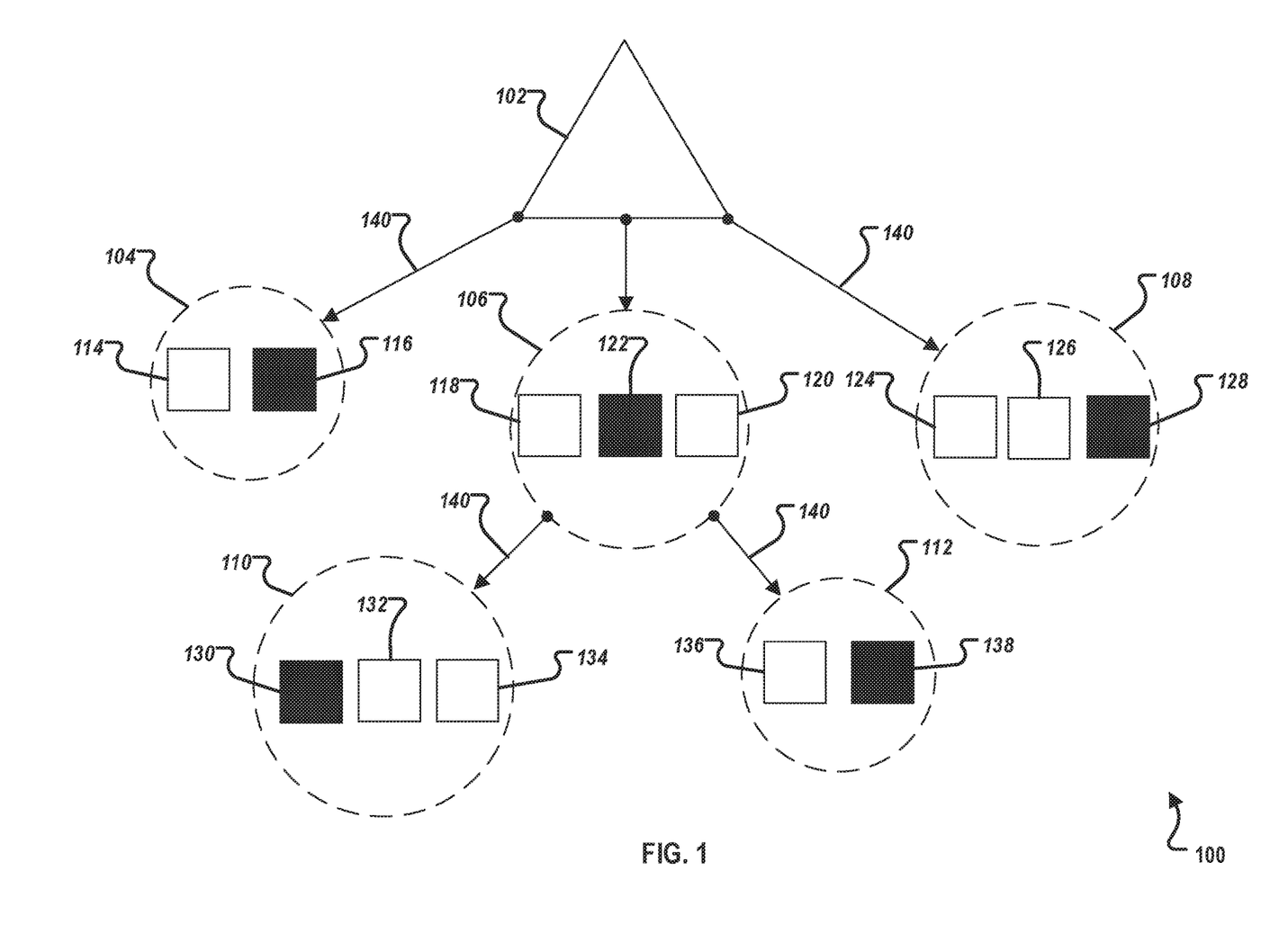
FIG. 1 is a diagram illustrating an example system that employs a logical hierarchy of data sources.

FIG. 1 is a diagram illustrating an example system 100 that employs a logical hierarchy of data sources, according to an implementation of the present disclosure. As illustrated in FIG. 1, system 100 is structured as a hierarchical tree, which contains three levels. The first level (that is, the "top" level) is the manufacturer 102, collecting and analyzing device data from devices in lower levels. The second and the third levels contain groups 104-112. Each group includes one delegate device and one or more non-delegate devices. For example, group 104 contains non-delegate device 114 and delegate device 116, group 106 contains non-delegate devices 118 and 120 and delegate device 122, group 108 contains non-delegate devices 124 and 126 and delegate device 128, group 110 contains delegate device 130 and non-delegate devices 132 and 134, and group 112 contains non-delegate device 136 and delegate device 138.

In some implementations, each group of devices has a single delegate device that is responsible for communication up and down the logical structure (for example, communicating analytical information up the hierarchy or distributing updates down the hierarchy). A delegate device can collect data from itself and from other non-delegate devices of the group in which it belongs. For example, delegate device 122 can collect its own data and data from non-delegate devices 118 and 120, which both belong to the same group 106. A delegate device can also collect data from another delegate device that is in a different group if they are in a parent-child relationship. For example, delegate device 122 is a parent device of delegate devices 130 and 138. Therefore, although delegate devices 130 and 138 do not belong to the same group with delegate device 122, they still send data to delegate device 122. In this way, each device in a group has knowledge of all other devices in that group. Each delegate device knows its parent device. A delegate device does not know the non-delegate devices in the parent's group. A non-delegate device does not know its parent. Each delegate device knows only one child device per group of children (that is, the delegate).

A delegate device distributes (shares) a self-generated secret to each device in its particular group and to associated child devices that are delegates of their respective groups. A shared secret can be a piece of data, known only to the parties involved in a secure communication, and can be generated by a number of conventional tools. For example, a secret can be a password, passphrase, a big number, or an array or randomly chosen values (such as, bytes). When a delegate becomes permanently unresponsive, the secret can be used to reestablish a trust between surviving devices. So if an established delegate becomes non-responsive (for example, after a certain timeout period), another device in the group can be configured to assume the delegate role and to ensure that another device is added to the group instead of the former delegate.

Figure 2:
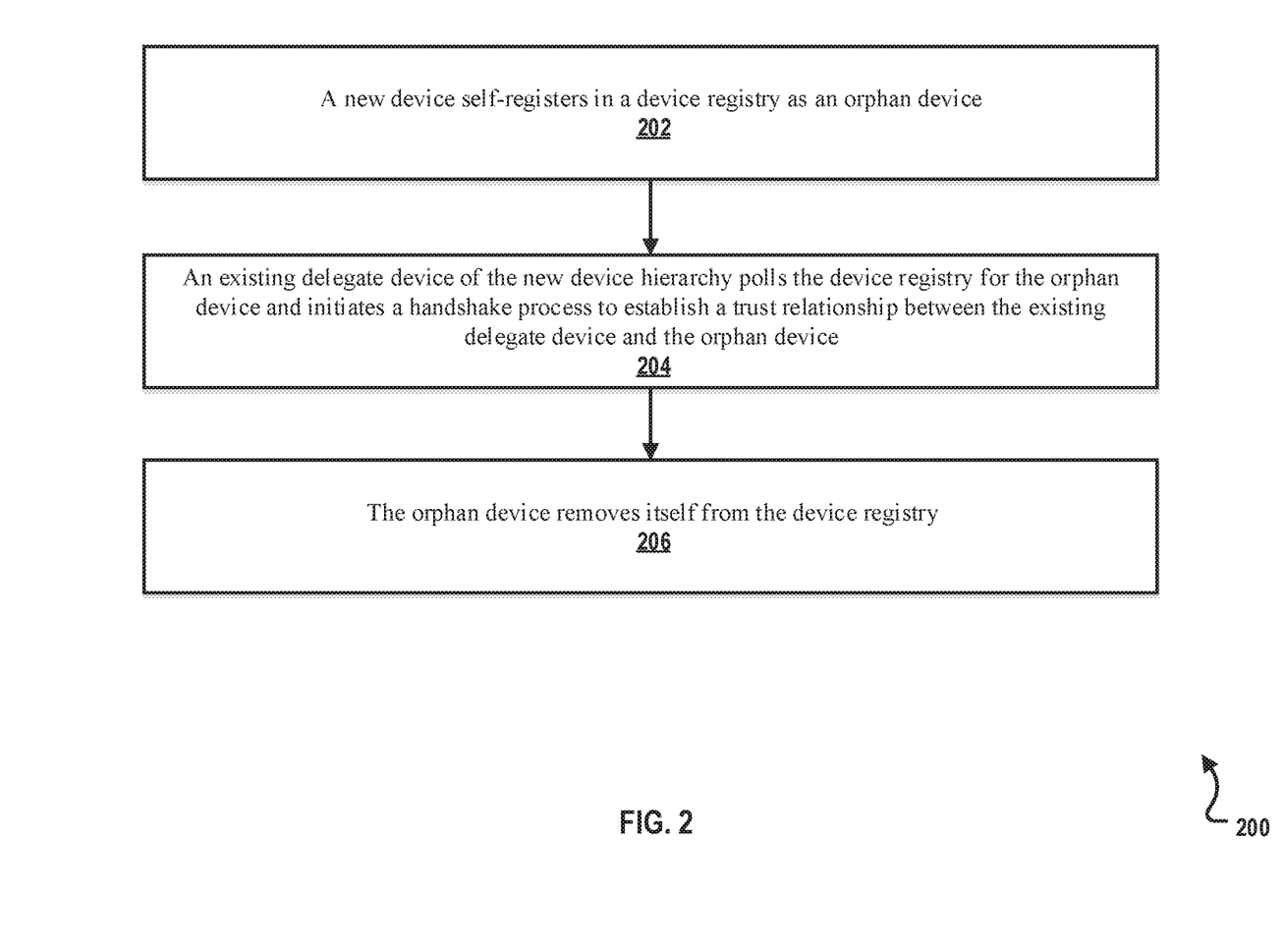
FIG. 2 is a flowchart illustrating a process of a new device joining the logical device hierarchy, according to an implementation of the present disclosure.

FIG. 2 is a flowchart 200 illustrating a process of a new device joining the logical device hierarchy, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a new device self-registers in a device registry as an orphan device. In some implementations, the registry is a hosted server that is accessible to all devices and is required for devices to find each other in order to form the hierarchy. The registry can expose a secure application programming interface (API) that enables devices to perform actions that accomplish these tasks, while leaving minimal traces. For example, when a device registers as an "orphan", it can use a temporary self-generated identification (ID), instead of its unique ID that it will share only with trusted devices. This temporary ID is used during the handshaking process with a prospective delegate device and is discarded once the adoption is complete. The "orphan" device also passes a self-generated delete-secret that the registry stores together with the entry that it creates, but that is not exposed through its API. A prospective adopting device locates this entry in the registry and initiates the handshake process. Once the handshake is successfully completed, the formerly "orphan" device removes itself from the registry while presenting its delete-secret to the registry. This ensures that no one but the "orphan" device can remove the entry. In some implementations, the registry itself can perform periodic cleanup during which stale/unused entries can be removed. In some implementations, when a new device is introduced, it can self-register in the registry as an "orphan" device, and as belonging to a specific analytics report. After 202, method 200 proceeds to 204.

At 204, an existing delegate device of the device hierarchy polls the device registry for the orphan device and initiates a handshake process to establish a trust between the existing delegate device and the orphan device. In some implementations, existing delegate devices poll the registry for orphan devices and initiate a handshake process to establish trust between the existing delegate device and the orphan device. During the handshake process, the two devices ensure they belong to the same analytics report, and share the same dimensional ranges. The dimensional ranges are defined by the device manufacturers, and correspond to the requirements of the analytics reports that the manufacturers would like to generate. After 204, method 200 proceeds to 206.

At 206, the orphan device removes itself from the registry. In some implementations, after a successful handshake, an adoption/association process starts. During the adoption process, the "orphan" device and the adopting device first verify that they trust each other (for example, through exchange of certificates and secrets). Each device then updates its own status by referencing to another device (such as, a parent, child, or sibling). If an association process is involved, devices will further make agreement on which of them should become the delegate. After a successful adoption/association, the orphan device removes itself from the registry.

In some implementations, when any device in a group becomes permanently non-responsive, a delegate device ensures the group remains large and functional. In some implementations, each hierarchy can be configured with a maximum/minimum number of devices per group and maximum/minimum number of child groups. This configuration can be established to ensure a balanced hierarchy. After 206, method 200 can stop.

Figure 3:
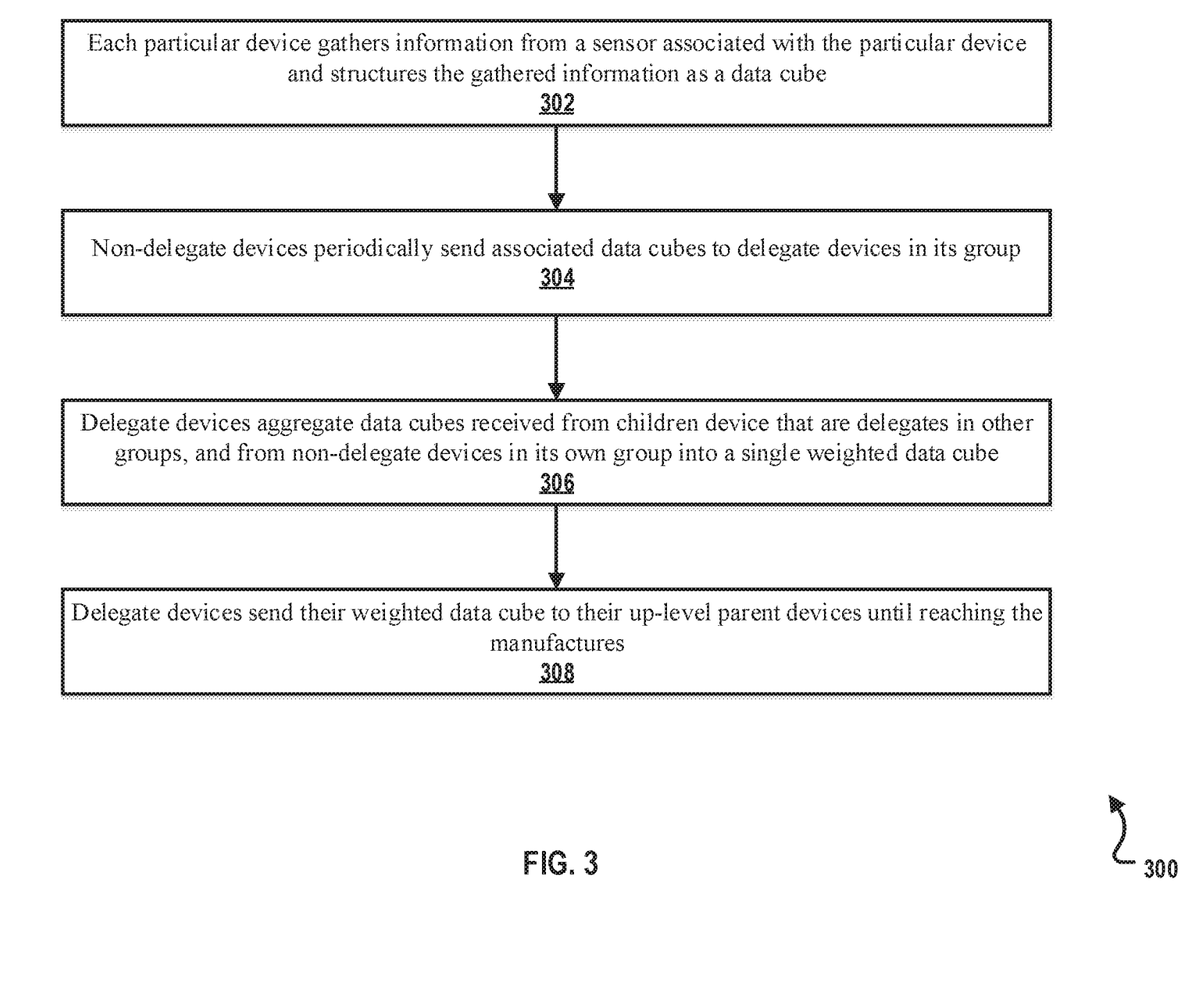
FIG. 3 is a flowchart illustrating a process of data propagation within the logical device hierarchy, according to an implementation of the present disclosure.

FIG. 3 is a flowchart 300 illustrating a process of data propagation within the logical device hierarchy, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, each particular device (that is, delegate device and non-delegate device) gathers information from a sensor associated with the particular device and structures the gathered information as a data cube. In analytics, the particular device can gather a lot of information with a sensor and aggregate the data into a set of data cubes, for example, a set of Online Analytical Processing (OLAP) cubes. In some implementations, the cube can be sliced in a way that fits the needs of a user. In a logical device hierarchy, the cube can be maintained at each level. That is, each individual device in each level maintains its own cube. This cube has a weight of 1. In this way, the higher up in the hierarchy, the more aggregated the data is that each delegate device receives, and more weight can placed on the data. After 302, method 300 proceeds to 304.

At 304, non-delegate devices periodically send their own data cubes to the delegate devices in its group. In some implementations, the data is sent according to a pre-determined time value or a dynamically determined time value (for example, based on an amount of data or data exceeding a threshold value). After 304, method 300 proceeds to 306.

At 306, delegate devices aggregate data cubes received from children devices that are delegates in other groups, and from non-delegate devices in its own group into a single weighted data cube. In some implementations, the weight of the aggregated cube is calculated as the sum of the weights of all the cubes that were aggregated (that is, the weight is a reflection of the number of devices that participated in the cube). After 306, method 300 proceeds to 308.

At 308, delegate devices send their weighted data cube to their up-level parent devices until the data reaches the manufacturer at the top level. After 308, method 300 can stop.

Figure 4:
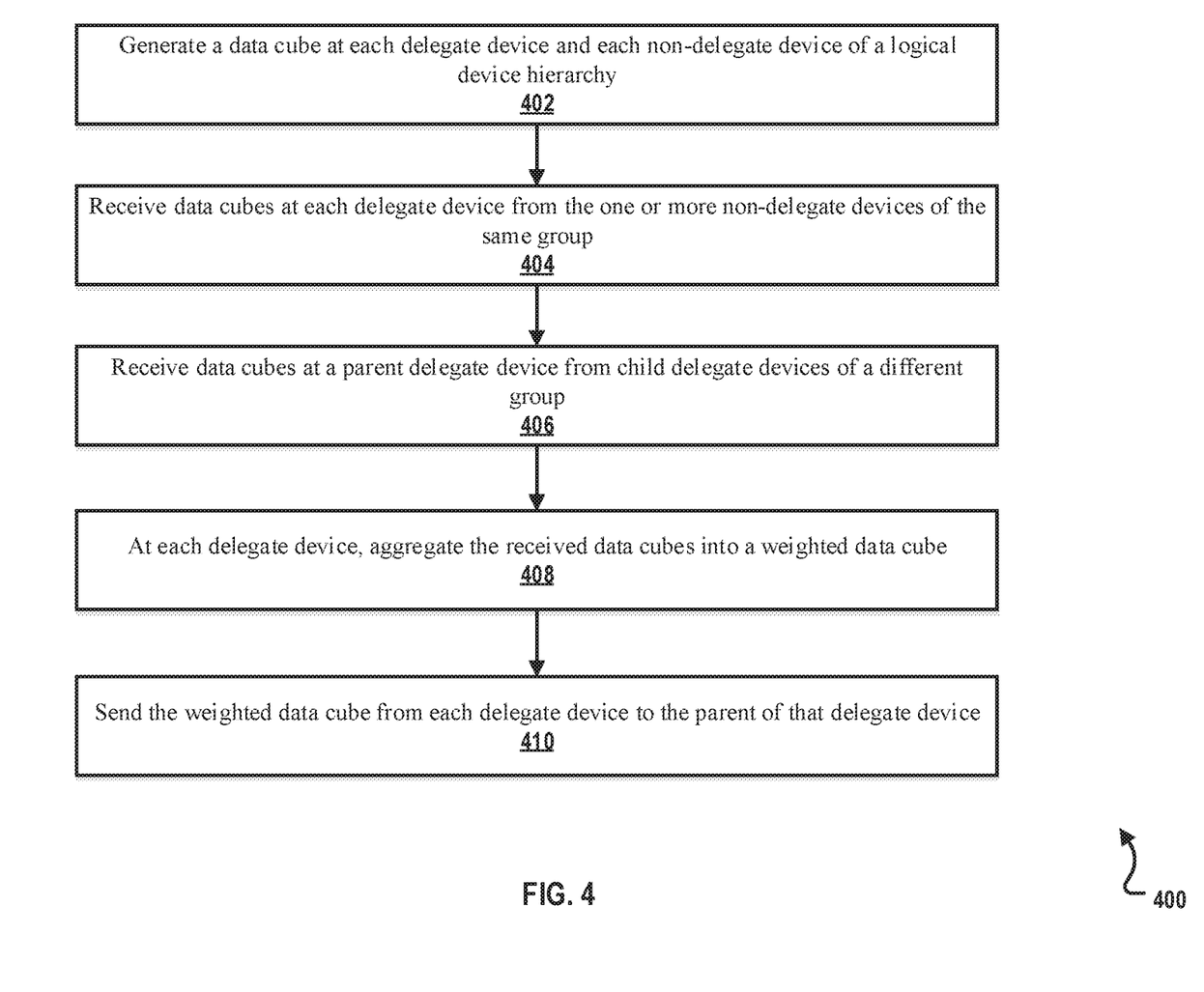
FIG. 4 is a flowchart illustrating an example process of collecting data within the logical device hierarchy, according to an implementation of the present disclosure.

FIG. 4 is a flowchart illustrating an example process 400 of collecting data within the logical device hierarchy, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a data cube is generated at each delegate device and each non-delegate device of a logical device hierarchy. The logical device hierarchy comprises more than one level. Each level comprises one or more groups, and each group comprises one delegate device and one or more non-delegate devices.

In some implementations, a top level of the logical device hierarchy comprises a manufacturer. In some implementations, a delegate device distributes a secret to each device of a same group, and to delegate devices of a different group, wherein the delegate device is a parent of the delegate device of a different group(s). In some implementations, delegate devices and non-delegate devices are grouped by dimensions, and delegate devices and non-delegate devices in the same group have identical dimensions.

In some implementations, a new device joins the logical device hierarchy by operations including a new device self-registering in a device registry as an orphan device, an existing delegate device of the logical device hierarchy polling the registry for the orphan device, and initiating a handshake process to establish a trust between the two devices, and the orphan device removes itself from the registry by the orphan device. After 402, method 400 proceeds to 404.

At 404, data cubes are received at each delegate device from the one or more non-delegate devices of the same group. In some implementations, a data cube is generated by operations including gathering information associated with the device from a sensor associated with the device, and arranging the gathered information into a data cube. After 404, method 400 proceeds to 406.

At 406, data cubes are received at the delegate device from delegate devices of a different group(s), and the delegate device is the parent of the delegate devices of a different group(s). After 406, method 400 proceeds to 408.

At 408, at each delegate device, the received data cubes are aggregated into a weighted data cube. After 408, method 400 proceeds to 410.

At 410, the weighted data cube is sent from each delegate device to the parent of the delegate device. In some implementations, delegate devices from a second level of the logical device hierarchy send the weighted data cube to the top level manufacturer. After 410, method 400 can stop.

Figure 5:
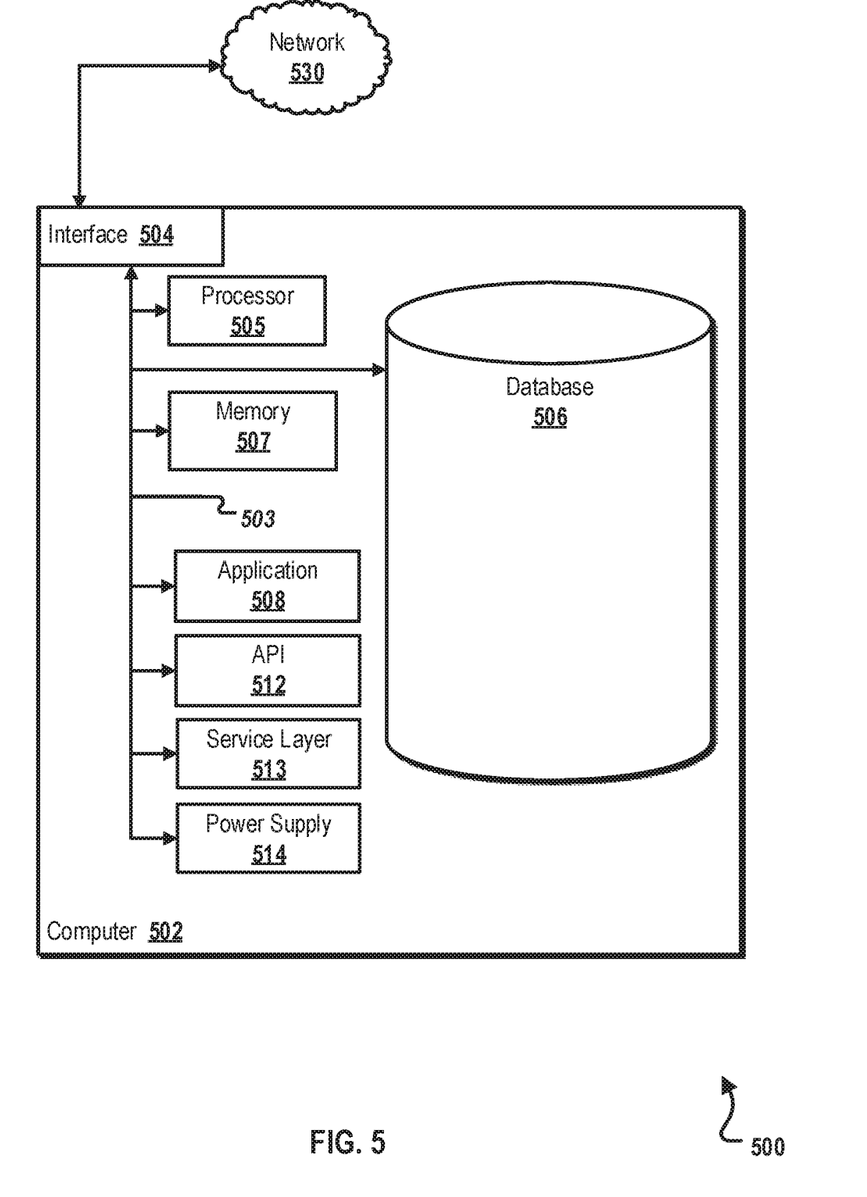
FIG. 5 is a block diagram illustrating an example of a computer-implemented System used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 502 can include an input device, such as a keypad, keyboard, touch screen, another input device, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as a client, network component, a server, a database or another persistency, another role, or a combination of roles for performing the subject matter described in the present disclosure. The illustrated Computer 502 is communicably coupled with a Network 530. In some implementations, one or more components of the Computer 502 can be configured to operate within an environment, including cloud-computing-based, local, global, another environment, or a combination of environments.

At a high level, the Computer 502 is an electronic computing device operable to receive, transmit, process, store, or manage data and information associated with the described subject matter. According to some implementations, the Computer 502 can also include or be communicably coupled with a server, including an application server, e-mail server, web server, caching server, streaming data server, another server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory, conventional, or another type of database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. The Database 506 can hold one or more of the previously described data types.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: generating, at each delegate device and each non-delegate device of a logical device hierarchy, a data cube, wherein the logical device hierarchy comprises more than one level, wherein each level comprises one or more groups, and wherein each group comprises one delegate device and one or more non-delegate devices; receiving, at each delegate device, data cubes from the one or more non-delegate devices associated with the same group; receiving, at each delegate device, data cubes from delegate devices of a different group, and wherein that delegate device is the parent of the delegate devices associated with a different group; aggregating, at each delegate device, the received data cubes into a weighted data cube; and sending, from each delegate device, the weighted data cube to the parent of the delegate device.

The foregoing and other described implementations can each, optionally, include one or more of the following features:

A first feature, combinable with any of the following features, wherein a top-level of the logical device hierarchy comprises a manufacturer.

A second feature, combinable with any of the previous or following features, further comprising sending, from delegate devices of a second-level of the logical device hierarchy, the weighted data cube to the manufacturer.

A third feature, combinable with any of the previous or following features, wherein a delegate device distributes a secret to each device of a same group and to delegate devices of different groups, and wherein the delegate device is a parent of the delegate devices of the different groups.

A fourth feature, combinable with any of the previous or following features, wherein the delegate devices and the non-delegate devices are grouped by dimensions, and the delegate device and the non-delegate devices in the same group have identical dimensions.

A fifth feature, combinable with any of the previous or following features, wherein a new device joins the logical device hierarchy by, self-registering the new device in a device registry as an orphan device; polling, by an existing delegate device of the logical device hierarchy, the device registry for the orphan device, and initiating a handshake process to establish a trust relationship between the existing delegate device and the orphan device; and removing, by means of the orphan device, the orphan device from the registry.

A sixth feature, combinable with any of the previous or following features, wherein generating a data cube comprises: gathering information associated with the delegate device or the non-delegate device from a sensor associated with the delegate device or the non-delegate device; and arranging the gathered information into a data cube corresponding with the delegate device or the non-delegate.

In a second implementation, a computer-implemented system, comprising: generating, at each delegate device and each non-delegate device of a logical device hierarchy, a data cube, wherein the logical device hierarchy comprises more than one level, wherein each level comprises one or more groups, and wherein each group comprises one delegate device and one or more non-delegate devices; receiving, at each delegate device, data cubes from the one or more non-delegate devices associated with the same group; receiving, at each delegate device, data cubes from delegate devices of a different group, and wherein that delegate device is the parent of the delegate devices associated with a different group; aggregating, at each delegate device, the received data cubes into a weighted data cube; and sending, from each delegate device, the weighted data cube to the parent of the delegate device.

The foregoing and other described implementations can each, optionally, include one or more of the following features:

A first feature, combinable with any of the following features, wherein a top-level of the logical device hierarchy comprises a manufacturer.

A second feature, combinable with any of the previous or following features, further comprising one or more instructions to send, from delegate devices of a second-level of the logical device hierarchy, the weighted data cube to the manufacturer.

A third feature, combinable with any of the previous or following features, wherein a delegate device distributes a secret to each device of a same group and to delegate devices of different groups, and wherein the delegate device is a parent of the delegate devices of the different groups.

A fourth feature, combinable with any of the previous or following features, wherein the delegate devices and the non-delegate devices are grouped by dimensions, and the delegate device and the non-delegate devices in the same group have identical dimensions.

A fifth feature, combinable with any of the previous or following features, wherein a new device joins the logical device hierarchy by, self-registering the new device in a device registry as an orphan device; polling, by an existing delegate device of the logical device hierarchy, the device registry for the orphan device, and initiating a handshake process to establish a trust relationship between the existing delegate device and the orphan device; and removing, by means of the orphan device, the orphan device from the registry.

A sixth feature, combinable with any of the previous or following features, wherein generating a data cube comprises one or more instructions to: gather information associated with the delegate device or the non-delegate device from a sensor associated with the delegate device or the non-delegate device; and arrange the gathered information into a data cube corresponding with the delegate device or the non-delegate.

In a third implementation, a computer-implemented system, comprising: generating, at each delegate device and each non-delegate device of a logical device hierarchy, a data cube, wherein the logical device hierarchy comprises more than one level, wherein each level comprises one or more groups, and wherein each group comprises one delegate device and one or more non-delegate devices; receiving, at each delegate device, data cubes from the one or more non-delegate devices associated with the same group; receiving, at each delegate device, data cubes from delegate devices of a different group, and wherein that delegate device is the parent of the delegate devices associated with a different group; aggregating, at each delegate device, the received data cubes into a weighted data cube; and sending, from each delegate device, the weighted data cube to the parent of the delegate device.

The foregoing and other described implementations can each, optionally, include one or more of the following features:

A first feature, combinable with any of the following features, wherein a top-level of the logical device hierarchy comprises a manufacturer.

A second feature, combinable with any of the previous or following features, further comprising one or more instructions to send, from delegate devices of a second-level of the logical device hierarchy, the weighted data cube to the manufacturer.

A third feature, combinable with any of the previous or following features, wherein a delegate device distributes a secret to each device of a same group and to delegate devices of different groups, and wherein the delegate device is a parent of the delegate devices of the different groups.

A fourth feature, combinable with any of the previous or following features, wherein the delegate devices and the non-delegate devices are grouped by dimensions, and the delegate device and the non-delegate devices in the same group have identical dimensions.

A fifth feature, combinable with any of the previous or following features, wherein a new device joins the logical device hierarchy by, self-registering the new device in a device registry as an orphan device; polling, by an existing delegate device of the logical device hierarchy, the device registry for the orphan device, and initiating a handshake process to establish a trust relationship between the existing delegate device and the orphan device; and removing, by means of the orphan device, the orphan device from the registry.

A sixth feature, combinable with any of the previous or following features, wherein generating a data cube comprises one or more operations to: gather information associated with the delegate device or the non-delegate device from a sensor associated with the delegate device or the non-delegate device; and arrange the gathered information into a data cube corresponding with the delegate device or the non-delegate.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies.

The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   generating, a logical hierarchy of data sources comprising a plurality of levels, wherein each level comprises one or more groups, and wherein each group comprises a delegate device and one or more non-delegate devices;
   retrieving information associated with each of the delegate device and the one or more non-delegate devices from associated sensors;
   arranging, at each delegate device, the information received from the one or more non-delegate devices associated with a same group into data cubes;
   receiving, at each delegate device, data cubes from delegate devices of a different group, and wherein a respective delegate device is a parent of the delegate devices associated with the different group;
   aggregating, at each delegate device, the data cubes into a weighted data cube; and
   sending, from each delegate device, the weighted data cube to the parent of the delegate device.

2. The computer-implemented method of claim 1, wherein a top-level of the logical hierarchy of data sources comprises a manufacturer.

3. The computer-implemented method of claim 2, further comprising sending, from delegate devices of a second-level of the logical hierarchy of data sources, the weighted data cube to the manufacturer.

4. The computer-implemented method of claim 1, wherein the delegate device distributes a secret to each device of the same group and to delegate devices of different groups, wherein the delegate device is a parent of the delegate devices of the different groups.

5. The computer-implemented method of claim 1, wherein the delegate devices and the non-delegate devices are grouped by dimensions, and the delegate device and the non-delegate devices in the same group have identical dimensions.

6. The computer-implemented method of claim 5, wherein the delegate devices and the non-delegate devices are grouped by ranges of the dimensions, and the delegate device and the non-delegate devices in the same group have identical ranges.

7. The computer-implemented method of claim 1, wherein a new device joins the logical hierarchy of data sources by:
   self-registering the new device in a device registry as an orphan device;
   polling, by an existing delegate device of the logical hierarchy of data sources, the device registry for the orphan device, and initiating a handshake process to establish a trust relationship between the existing delegate device and the orphan device; and
   removing, using the orphan device, the orphan device from the device registry.

8. A non-transitory, computer-readable medium storing one or more instructions executable by a computer system to perform operations comprising:
   generating, a logical hierarchy of data sources comprising a plurality of levels, wherein each level comprises one or more groups, and wherein each group comprises a delegate device and one or more non-delegate devices;
   retrieving information associated with each of the delegate device and the one or more non-delegate devices from associated sensors;
   arranging, at each delegate device, the information received from the one or more non-delegate devices associated with a same group into data cubes;

receiving, at each delegate device, data cubes from delegate devices of a different group, and wherein a respective delegate device is a parent of the delegate devices associated with the different group;

aggregating, at each delegate device, the data cubes into a weighted data cube; and sending, from each delegate device, the weighted data cube to the parent of the delegate device.

9. The non-transitory, computer-readable medium of claim 8, wherein a top-level of the logical hierarchy of data sources comprises a manufacturer.

10. The non-transitory, computer-readable medium of claim 9, further comprising one or more instructions to send, from delegate devices of a second-level of the logical hierarchy of data sources, the weighted data cube to the manufacturer.

11. The non-transitory, computer-readable medium of claim 8, wherein the delegate device distributes a secret to each device of the same group and to delegate devices of different groups, and wherein the delegate device is a parent of the delegate devices of the different groups.

12. The non-transitory, computer-readable medium of claim 8, wherein the delegate devices and the non-delegate devices are grouped by dimensions, and the delegate device and the non-delegate devices in the same group have identical dimensions.

13. The non-transitory, computer-readable medium of claim 12, wherein the delegate devices and the non-delegate devices are grouped by ranges of the dimensions, and the delegate device and the non-delegate devices in the same group have identical ranges.

14. The non-transitory, computer-readable medium of claim 8, wherein a new device joins the logical hierarchy of data sources by:

self-registering the new device in a device registry as an orphan device;

polling, by an existing delegate device of the logical hierarchy of data sources, the device registry for the orphan device, and initiating a handshake process to establish a trust relationship between the existing delegate device and the orphan device; and removing, using the orphan device, the orphan device from the device registry.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

generating, a logical hierarchy of data sources comprising a plurality of levels, wherein each level comprises one or more groups, and wherein each group comprises a delegate device and one or more non-delegate devices;

retrieving information associated with each of the delegate device and the one or more non-delegate devices from associated sensors;

arranging, at each delegate device, the information received from the one or more non-delegate devices associated with a same group into data cubes;

receiving, at each delegate device, data cubes from delegate devices of a different group, and wherein a respective delegate device is a parent of the delegate devices associated with the different group;

aggregating, at each delegate device, the data cubes into a weighted data cube; and sending, from each delegate device, the weighted data cube to the parent of the delegate device.

16. The computer-implemented system of claim 15, wherein a top-level of the logical hierarchy of data sources comprises a manufacturer.

17. The computer-implemented system of claim 16, further comprising one or more operations to send, from delegate devices of a second-level of the logical hierarchy of data sources, the weighted data cube to the manufacturer.

18. The computer-implemented system of claim 15, wherein the delegate device distributes a secret to each device of the same group and to delegate devices of different groups, and wherein the delegate device is a parent of the delegate devices of the different groups.

19. The computer-implemented system of claim 18, wherein the delegate devices and the non-delegate devices are grouped by dimensions, and the delegate device and the non-delegate devices in the same group have identical dimensions.

20. The computer-implemented system of claim 15, wherein a new device joins the logical hierarchy of data sources by:

self-registering the new device in a device registry as an orphan device;

polling, by an existing delegate device of the logical hierarchy of data sources, the device registry for the orphan device, and initiating a handshake process to establish a trust relationship between the existing delegate device and the orphan device; and removing, using the orphan device, the orphan device from the device registry.

* * * * *